Figure 1:
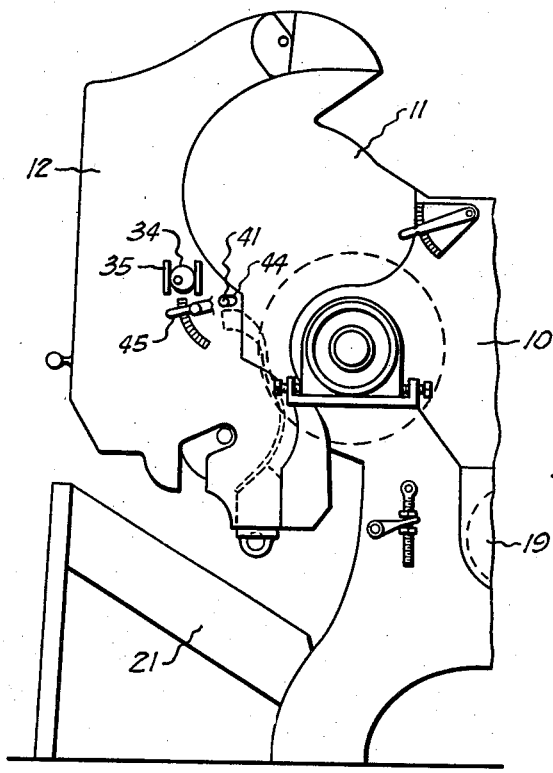

March 30, 1943.  H. E. THOMPSON  2,315,140
COTTON GIN
Filed April 11, 1941  2 Sheets-Sheet 1

Inventor
Henry E. Thompson
By Jack A. Ashley
Attorney

March 30, 1943.   H. E. THOMPSON   2,315,140
COTTON GIN
Filed April 11, 1941   2 Sheets-Sheet 2

Inventor
Henry E. Thompson

Patented Mar. 30, 1943

2,315,140

UNITED STATES PATENT OFFICE 2,315,140

COTTON GIN

Henry E. Thompson, Dallas, Tex., assignor to The Murray Company, Dallas, Tex., a corporation of Texas Application April 11, 1941, Serial No. 388,018

9 Claims. (Cl. 19—56)

This invention relates to new and useful improvements in cotton gins.

This invention relates particularly to the control of the seed outlet channel and also to the control of the seed roll, whereby the gin may efficiently handle the different kinds or breeds of cotton, each of which may have various size seed.

One object of the invention is to provide improved means for varying the area of the seed outlet channel between the huller ribs and the ginning ribs, whereby this channel may be varied in accordance with the different ginning conditions and in accordance with different size seed; the construction being such that the adjustment may be made without adjusting the seed lambrequin or seed comb, whereby the ginning area of the saws within the roll box is not varied when a change in the size of the seed outlet channel is made.

An important object of the invention is to provide a cotton gin having an improved huller rib assembly which is movably mounted with relation to the ginning ribs, together with means operable from the exterior of the gin stand for adjusting said huller rib assembly with respect to the ginning ribs to vary the space or seed channel therebetween and thereby regulate the discharge of ginned seed from the seed roll to suit any condition and obtain maximum ginning capacity of different types of cotton.

Another object of the invention is to provide an improved means for adjusting or controlling the size of the seed outlet channel of a cotton gin which means is so constructed that the adjustment may be quickly and easily made while the gin is in operation, whereby the channel may be regulated at any time without interrupting the ginning of the cotton.

A particular object of the invention is to provide a movable means which is a part of the huller rib assembly and which is associated with the roll box of a cotton gin, for acting upon the seed roll within the roll box to tighten or loosen the same in accordance with the condition and quality of the cotton being ginned, said means being adjustable independently of the usual lambrequin or seed comb, whereby the seed roll may be tightened or loosened without adjusting the lambrequin and without restricting or reducing the number of teeth of the ginning saws within the area of the roll box.

Still another object of the invention is to provide a huller rib assembly which is pivotally mounted at its lower end, whereby its upper end may be swung inwardly and outwardly of the ginning ribs; said assembly having its upper rail movable with respect to the interior of the roll box and also having a lambrequin or seed comb mounted thereon and capable of independent adjustment; the construction providing a dual adjustment for regulating the discharge of the ginned seed and also permitting a tightening or loosening of the seed roll without restricting or reducing the ginning capacity, whereby maximum efficiency of ginning different types of cotton having various size seed under all conditions may be obtained.

The construction designed to carry out the invention will be hereinafter described together with other features of the invention.

Figure 6:
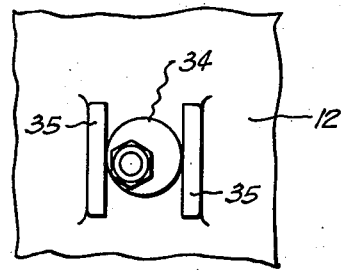
Figure 8:
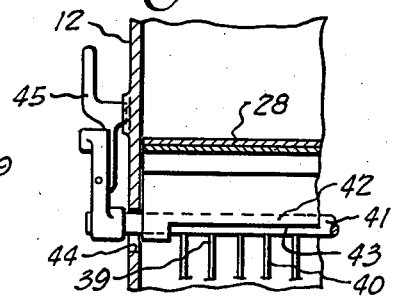
Figure 4:
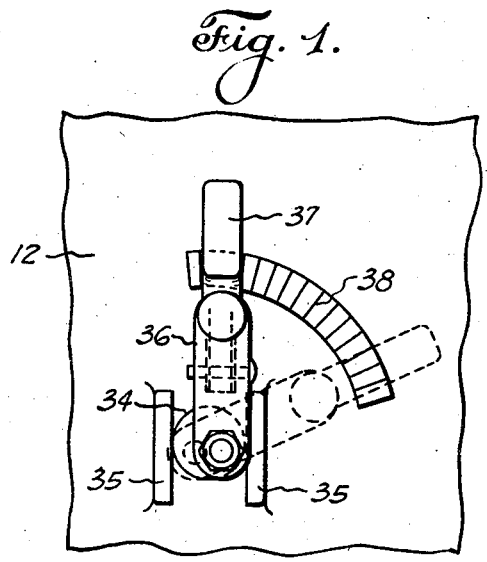
Figure 5:
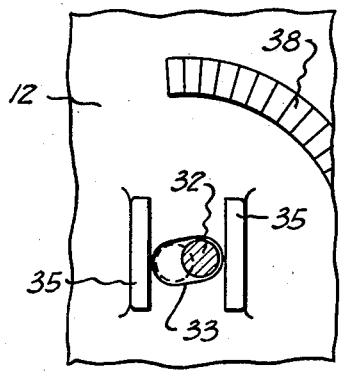
Figure 2:
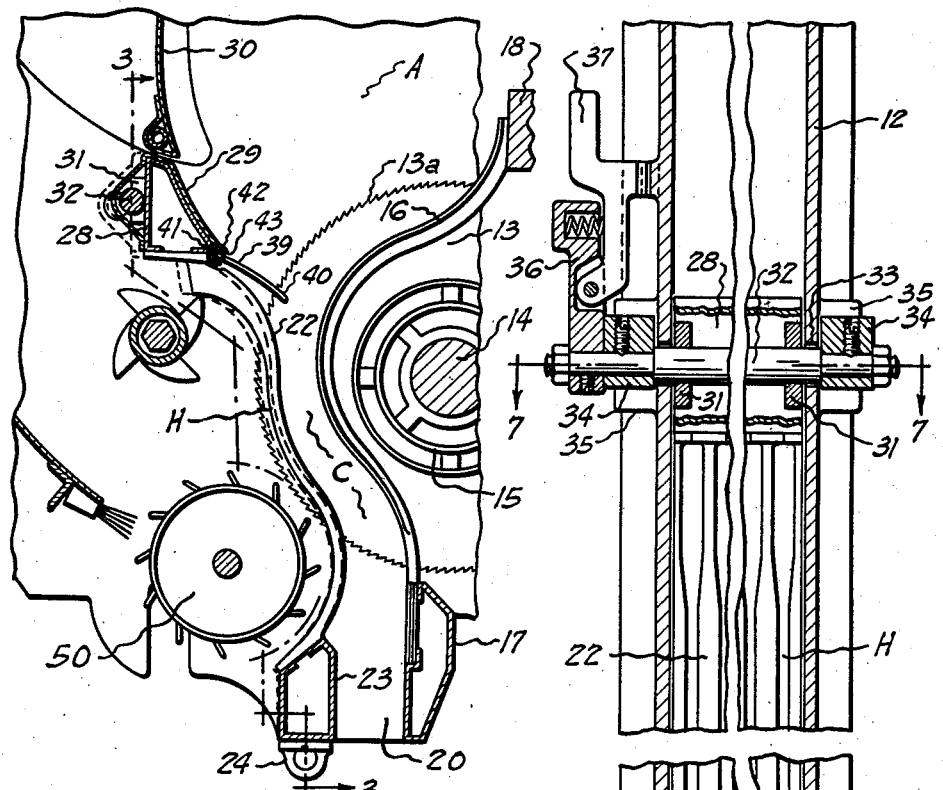
Figures 3, 7:
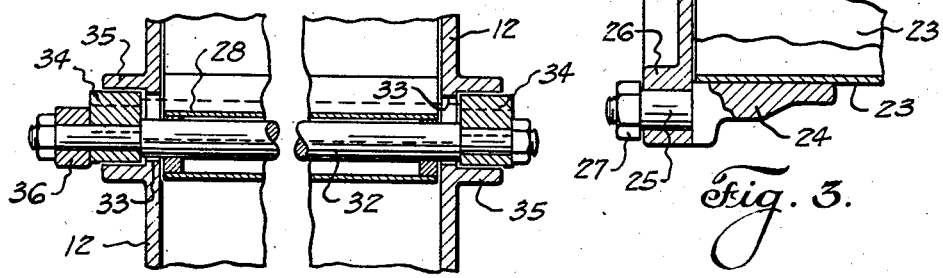

The invention will be more readily understood from a reading of the following specification and by reference to the accompanying drawings, as an example of the invention is shown, and wherein:

Figure 1 is a partial side elevation of a cotton gin, constructed in accordance with the invention, Figure 2 is a partial enlarged, transverse, vertical sectional view and showing the ribs and saws of the gin, Figure 3 is an enlarged, vertical sectional view, taken on the line 3—3 of Figure 2, Figure 4 is an enlarged side elevation of the operating lever and cam for adjusting the huller ribs, Figure 5 is a side elevation similar to Figure 4, with the operating lever and cam disk removed from the shaft, Figure 6 is an enlarged elevation of one of the cam disks, Figure 7 is a horizontal sectional view, taken on the line 7—7 of Figure 3, and Figure 8 is an enlarged detail of the mounting of the lambrequin or seed comb.

In the drawings, the numeral 10 designates a portion of the stand or frame of a cotton gin. An inner breast 11 is pivoted to the gin stand and an outer breast 12 is pivotally secured to the inner breast, these parts being of the usual construction. The gin includes a battery of ginning saws 13 which are mounted on a transversely extending, rotatable shaft 14, the saws being spaced from each other by suitable spacers 15. Curved ginning ribs 16 are disposed between the saws in the usual manner, and each rib has its lower end secured to a transversely extending rib rail 17, with its upper end fastened to a supporting bar 18 which is located above the saws 13 at the rear of the roll box A of the gin. As is well known, the seed roll which accumulates in the roll box is acted upon by the teeth 13a of the ginning saws and the lint is stripped from the seeds. The lint is carried between the ribs 16 and removed from the saws by suitable means and dropped into the usual lint duct at the rear of the gin stand, a portion of said duct being illustrated at 19 in Figure 1. The delinted seeds fall downwardly from the roll box A between the saws 13 and along the ribs 16 and discharge from a discharge opening 20 which is located adjacent the lower rib rail 17. A seed pan or chute 21 below the discharge receives the seed and conducts the same to a suitable conveyor (not shown).

The above parts are of standard construction and are common in cotton gins which are in general use, said parts being described merely for the sake of clarity. Obviously, such parts are subject to variation.

In carrying out the present invention, a huller rib assembly H is mounted within the gin and is supported within the outer breast 12. This assembly includes a plurality of huller ribs 22 which are curved in the usual manner and which are disposed between the forward portions of the ginning saws 13. The ribs 22 are spaced from the ribs 16, as is clearly shown in Figure 2, whereby an elongate curved seed channel or passage C is formed therebetween. This channel extends from the lower portion of the roll box A to the discharge outlet 20 and provides a path through which the delinted seed may fall from the roll within said box.

The lower end of each huller rib 22 is secured to a rib rail 23 which is spaced from the lower rib rail 17, the space between said rails forming the discharge opening 20. The rib rail 23 extends transversely across the lower portion of the outer breast and is provided with depending brackets or castings 24 which are located adjacent the end walls of the breast (Figure 3). Each bracket is suitably secured to the underside of the rail 23 and has an outwardly projecting pivot pin or stud 25 preferably integral therewith. Each pin is rotatable within a bearing collar 26 which is formed on the side wall of the breast 12 and a nut 27 is threaded onto the outer end of the pin and prevents displacement of said pin from within the collar. In this manner, the lower end of the huller rib assembly H is pivotally mounted within the breast, whereby the entire assembly may be swung inwardly and outwardly of the ginning ribs 16 to vary the size of the seed outlet channel C.

The upper ends of the huller ribs 22 are secured to an upper rib rail 28 which extends transversely across the breast 12 at the lower front portion of the roll box A. The inner surface of the rail 28 is curved as shown at 29 so as to form a continuation of the inner curved surface of the usual hinged door 30 which closes the front of the roll box. The rib rail 28 has forwardly directed ears or lugs 31 welded, or otherwise fastened thereto and these ears are disposed, one adjacent each side wall of the breast 12 (Figure 3). An elongate shaft 32 which extends transversely across the interior of the breast passes through the ears 31 has its ends projecting through inclined slots 33 in the side walls of said breast. As is clearly shown in Figure 5, the slots are of greater length than the diameter of the shaft, whereby the shaft may undergo movement within said slots. Manifestly, movement of the shaft within the slots will result in a swinging of the huller rib assembly on the pivot pins or studs 25, whereby the huller ribs 22 will be moved relative to the ginning ribs 16 to vary the size of the seed outlet channel C.

For imparting movement to the shaft 32 to affect an adjustment of the huller rib assembly H, each end of the shaft has a cam disk 34 eccentrically mounted thereon, said disks being located exteriorly of the side walls of the gin breast. Each cam disk is confined against movement in a lateral or horizontal plane by projections or lugs 35 which extend outwardly from the wall of the breast. Since the cam disks are confined against lateral movement between the projections and also since the ends of the shaft 32 are eccentrically secured to said disks, it is manifest that a rotation of said disks will result in a lateral movement of the shaft 32 within the slots 33. The inclination of the slots permits lateral movement of the shaft without binding upon rotation of the cam disks.

For imparting rotation to the cam disks to move the shaft 32 and thereby adjust the huller rib assembly, one end of the shaft 32 projects beyond the outer face of the cam disk and has a manual operating lever 36 fastened thereto. When the lever is swung rotation is imparted to the shaft and to the cam disks 34 secured to said shaft and, as explained, the disks are confined against lateral displacement by the projections 35, with the result that the shaft 32 is shifted within the slots 33. In order to lock the shaft in various adjusted positions within the slots, the lever 36 is provided with a pivoted spring-pressed latch 37 which is arranged to engage the teeth 38 of an arcuate ratchet, the latter being disposed on the outer wall of the breast 12.

A lambrequin or seed comb 39 is mounted at the lower end of the upper rib rail 28 and includes the usual teeth 40 which extend inwardly between the ginning saws 13 at the lower portion of the roll box A. The shaft 41 of the lambrequin is rotatably confined within a hollow cover or sleeve 42 which is provided with a radial slot 43 through which the teeth 40 of the lambrequin project. The cover 42 is suitably fastened to the rib rail 28 and the ends of the lambrequin shaft extend through and are movable within inclined slots 44 in the side wall of the breast. One end of the shaft has a hand lever 45 secured thereto, whereby rotation may be imparted to the shaft to adjust the teeth of the lambrequin with respect to the roll box A and also with respect to the ribs 16. It is noted that the lambrequin is adjustable independently of the huller ribs and is also adjustable or movable with said ribs.

Various types or breeds of cotton have different size seed and it is desirable and substantially essential that the discharge of the delinted seed be controlled in accordance with the condition and quality of the cotton in order to obtain maximum ginning efficiency. It is also necessary to vary the size of the seed roll, that is, tighten or loosen the roll, in accordance with the particular cotton and its condition. Heretofore, the lambrequin or seed comb has been utilized to obtain this control of the size of the seed discharge channel C and also of the seed roll. However, it is obvious that when the lambrequin teeth 40 are swung upwardly from the position shown in Figure 2 so that the seed channel or passage is restricted, the seed roll will be tightened which may not be desirable. Also, a number of the teeth 13a of the ginning saws are, in effect, taken out of the area of the roll box, with the result that the ginning capacity is reduced since such teeth cannot act upon the roll. At the same time, the contour of the roll is changed which is also undesirable. Similarly, a downward swinging of the lambrequin to affect an enlargement of the seed outlet channel C results in loosening of the roll, as well as changing the contour or shape of said roll. With the present invention, the use of the lambrequin for controlling the discharge channel C is eliminated and a much finer and more accurate adjustment of the channel, as well as a more efficient control of the seed roll may be had.

In the operation of the device, the cotton is introduced into the forward breast 12 and this cotton includes the hulls, as well as the seed. The cotton is engaged by a kicker roller 50 which directs the cotton into engagement with the teeth 13a of the ginning saws 13. The saws, acting upon the cotton draw the cotton and seed through the huller ribs 22 but due to the spacing of said ribs, the hulls cannot pass between said ribs and are discharged from the lower end of the forward breast 12. The cotton and seed are carried into the roll box A where a seed roll is formed. The teeth 13a of the saws 13 act upon the cotton and pull said lint cotton through the ginning ribs 16, whereby the seeds are delinted. The delinted seeds then fall downwardly from the roll box A through the seed outlet channel or passage C and finally escape from the gin through the discharge opening 20, which is located between the lower rib rails 17 and 23.

When it is desired to change the space between the huller ribs 22 and the ginning ribs 16 to vary the size of the seed channel C, it is only necessary to swing the hand lever 36, whereby the cam disks 34 are rotated between the projections 35. As explained, such rotation of the disk imparts a lateral movement to the shaft 32, whereby the upper end of the huller rib assembly is moved with relation to the ginning ribs 16. At the time that the huller rib assembly is adjusted to either restrict or enlarge the seed passage C, the lambrequin 39 remains in its original position with respect to the assembly, whereby there is no change in the number of teeth 13a of the ginning saws 13 within the area of the roll box. Therefore, an adjustment or variation of the seed outlet passage C may be accomplished without restricting the efficiency of the ginning operation. Of course, the lambrequin 39 may be adjusted at any desired time independently of the huller rib assembly.

The curved inner surface 29 of the upper rib rail is within the interior of the roll box A. Manifestly, when the huller rib assembly is swung inwardly toward the ginning ribs 16, this curved surface 29 of the upper rib rail will be moved into the roll box so that it will act upon the seed roll to tighten said roll. Similarly, when the huller rib assembly is moved outwardly with relation to the ginning ribs 16, the upper rib rail is moved outwardly of the roll box A to loosen the seed roll. Due to the curved surface 29, the seed roll may be tightened or loosened without substantially changing the contour of said roll, as would be the case if the lambrequin 39 were employed for this purpose. Further, the tightening or loosening of the seed roll may be carried out without reducing the number of saw teeth 13a within the area of the roll box A.

From the foregoing, it will be seen that a dual adjustment for regulating the size of the seed outlet passage or channel C is provided. The seed roll may be adjusted by manipulating the huller rib assembly and may be further adjusted by operating the independently adjustable lambrequin. The upper rib rail 28 may be utilized to tighten or loosen the seed roll within the roll box A to meet the requirements brought about by different ginning conditions. The variation in the seed channel C, as well as an adjustment for control of the seed roll may be carried out without reducing the effective ginning area within the roll box. It is noted that the adjustment may be carried out while the gin stand is in operation, whereby it is not necessary to halt the ginning in order to adjust the huller ribs. Therefore, adjustment may be made to suit any condition and to obtain the greatest capacity when ginning different types or breeds of cotton and different conditions. Obviously, the seed channel C will be restricted when cotton having smaller seed is being ginned and will be opened to provide a larger passage when cotton having larger seed is passing through the gin.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The combination with a cotton gin having a battery of ginning saws with ginning ribs disposed therebetween and also having a roll box above said saws, of a huller rib assembly, including a lower rib rail located below the saws, an upper rib rail disposed within the forward portion of the roll box, a plurality of huller ribs fastened to the rib rails and extending between the saws, said huller ribs being spaced from the ginning ribs whereby a seed outlet channel from the roll box is formed between the ribs, means for pivotally mounting the lower rib rail, whereby the huller rib assembly may be swung relative to the ginning ribs to vary the space between the huller ribs and ginning ribs, means connected with the upper rib rail to swing said assembly to properly adjust the huller ribs with respect to the ginning ribs, and means operable from the exterior of the gin for actuating said last named means.

2. The combination with a cotton gin having a battery of ginning saws with ginning ribs disposed therebetween and also having a roll box above said saws, of a huller rib assembly, including a lower rib rail located below the saws, an upper rib rail disposed within the forward portion of the roll box, a plurality of huller ribs fastened to the rib rails and extending between the saws, said huller ribs being spaced from the ginning ribs whereby a seed outlet channel from the roll box is formed between the ribs, means for pivotally mounting the lower rib rail, whereby the huller rib assembly may be swung relative to the ginning ribs to vary the space between the huller ribs and ginning ribs, means connected with the upper rib rail to swing said assembly to properly adjust the huller ribs with respect to the ginning ribs, and a latch for locking the assembly in any desired position.

3. The combination with a cotton gin having a battery of ginning saws with ginning ribs disposed therebetween and also having a roll box above said saws, of a huller rib assembly, including a lower rib rail located below the saws, an upper rib rail disposed within the forward portion of the roll box, a plurality of huller ribs fastened to the rib rails and extending between the saws, said huller ribs being spaced from the ginning ribs whereby a seed outlet channel from the roll box is formed between the ribs, means for pivotally mounting the lower rib rail, whereby the huller rib assembly may be swung relative to the ginning ribs to vary the space between the huller ribs and ginning ribs, means connected with the upper rib rail to swing said assembly to properly adjust the huller ribs with respect to the ginning ribs, a lambrequin mounted on the upper rib rail of the huller rib assembly and extending inwardly between the saws adjacent the lower end of the roll box, and means for adjusting said lambrequin independently of the assembly.

4. The combination with a cotton gin having a battery of ginning saws with ginning ribs disposed therebetween and also having a roll box above said saws, of a huller rib assembly including, a lower rib rail located below the saws, an upper rib rail disposed within the forward portion of the roll box and forming a part thereof, a plurality of huller ribs fastened to the rib rails and extending between the saws, the lower rib rail being pivotally mounted within the gin, whereby the assembly may be swung inwardly and outwardly to move the upper rib rail toward and away from the roll box so as to loosen and tighten the seed roll within said box.

5. The combination with a cotton gin having a battery of ginning saws with ginning ribs disposed therebetween and also having a roll box above said saws, of a huller rib assembly, including a lower rib rail located below the saws, an upper rib rail disposed within the forward portion of the roll box, a plurality of huller ribs fastened to the rib rails and extending between the saws, the lower rib rail being pivotally mounted within the gin, whereby the assembly may be swung inwardly and outwardly to move the upper rib rail toward and away from the roll box so as to loosen and tighten the seed roll within said box, said upper rail having its inner surface curved, whereby tightening and loosening of the roll may be accomplished without substantially changing the contour of said roll.

6. The combination with a cotton gin having a battery of ginning saws with ginning ribs disposed therebetween and also having a roll box above said saws, of a huller rib assembly including, a lower rib rail located below the saws, an upper rib rail disposed within the forward portion of the roll box and forming a part thereof, a plurality of huller ribs fastened to the rib rails and extending between the saws, the huller ribs being spaced from the ginning ribs whereby a seed outlet channel from the roll box is formed between said ribs, and adjustable means for moving the upper portion of the huller rib assembly relative to the ginning rib and said roll box to vary the size of the upper end of the channel in accordance with the type and condition of cotton being ginned without materially changing the size of the lower end of said channel and to loosen and tighten the seed roll without materially altering the contour thereof.

7. The combination with a cotton gin having a battery of ginning saws with ginning ribs disposed therebetween and also having a roll box above said saws, of a huller rib assembly including, a lower rib rail located below the saws, an upper rib rail disposed within the forward portion of the roll box and forming a part thereof, a plurality of huller ribs fastened to the rib rails and extending between the saws, said huller ribs being spaced from the ginning ribs whereby a seed outlet channel from the roll box is formed between the ribs, adjustable means for moving the upper portion of the huller rib assembly relative to the ginning rib and said roll box to vary the size of the upper end of the channel in accordance with the type and condition of cotton being ginned without materially altering the size of the lower end of said channel and to loosen and tighten the seed roll without substantially changing the contour thereof, a lambrequin secured to the top rib rail and extending inwardly between the saws, and means for adjusting the lambrequin independently of the assembly.

8. The combination with a cotton gin having a battery of ginning saws with ginning ribs disposed therebetween and also having a roll box above said saws, of a huller rib assembly, including a lower rib rail located below the saws, an upper rib rail disposed within the forward portion of the roll box, a plurality of huller ribs fastened to the rib rails and extending between the saws, said huller ribs being spaced from the ginning ribs whereby a seed outlet channel from the roll box is formed between the ribs, and adjustable means for swinging the upper portion of the assembly outwardly and inwardly to move the upper rib rail outwardly and inwardly of the roll box without substantially varying the position of said lower rib rail and the lower portion of the huller ribs relative to said ginning ribs, whereby the seed roll within said box is tightened by the engagement of the rail therewith upon inward movement of said rail and is loosened upon outward movement of the rail.

9. The combination with a cotton gin having a battery of ginning saws with ginning ribs disposed therebetween and also having a roll box above said saws, of a huller rib assembly, including a lower rib rail located below the saws, an upper rib rail disposed within the forward portion of the roll box, a plurality of huller ribs fastened to the rib rails and extending between the saws, said huller ribs being spaced from the ginning ribs whereby a seed outlet channel from the roll box is formed between the ribs, and means for adjustably and pivotally mounting the assembly within the gin to permit a movement of the upper rib rail outwardly and inwardly of the roll box without substantially varying the position of the lower rib rail and the lower portion of the huller ribs relative to said ginning ribs, whereby the seed roll within said box is tightened by the engagement of the rail therewith upon inward movement of said rail and is loosened upon outward movement of the rail, said rib rail having its inner surface curved, whereby tightening and loosening of the roll may be accomplished without substantially changing the contour of said roll.

HENRY E. THOMPSON.